(12) United States Patent
Scott et al.

(10) Patent No.: US 11,553,162 B2
(45) Date of Patent: Jan. 10, 2023

(54) IMAGE PROCESSING SYSTEM FOR EXTENDING A RANGE FOR IMAGE ANALYTICS

(71) Applicant: Evolon Technology, LLC, Dallas, TX (US)

(72) Inventors: Shannon Scott, Los Alamos, NM (US); Steven Schramm, Los Alamos, NM (US)

(73) Assignee: Evolon Technology, Inc., Dallas, TX (US)

( * ) Notice: Subject to any disclaimer, the term of this patent is extended or adjusted under 35 U.S.C. 154(b) by 56 days.

(21) Appl. No.: 17/131,358

(22) Filed: Dec. 22, 2020

(65) Prior Publication Data

US 2021/0192213 A1    Jun. 24, 2021

Related U.S. Application Data

(60) Provisional application No. 62/953,117, filed on Dec. 23, 2019.

(51) Int. Cl.
*G06K 9/00*      (2022.01)
*H04N 7/56*      (2006.01)
(Continued)

(52) U.S. Cl.
CPC .............. *H04N 7/56* (2013.01); *G06K 9/628* (2013.01); *G06T 3/40* (2013.01); *G06T 7/11* (2017.01); *G06T 7/70* (2017.01); *G06T 9/00* (2013.01); *G06V 20/20* (2022.01); *G06V 20/41* (2022.01); *G06V 20/52* (2022.01); *G08B 13/19604* (2013.01); *G08B 13/19606* (2013.01); *G08B 13/19673* (2013.01); *G08B 13/19689* (2013.01); *G08B 29/185* (2013.01); *H04N 5/23212* (2013.01); *H04N 5/23296* (2013.01); *H04N 5/23299* (2018.08); *H04N 7/185* (2013.01); *G06T 2207/20132* (2013.01); *G08B 21/18* (2013.01)

(58) Field of Classification Search
CPC .. H04N 7/56; H04N 5/23212; H04N 5/23296; H04N 5/23299; H04N 7/185; H04N 5/23218; H04N 5/23229; H04N 7/181; G06K 9/628; G06T 3/40; G06T 7/11; G06T 7/70; G06T 9/00; G06T 2207/20132; G06V 20/20; G06V 20/41; G06V 20/52; G06V 10/255; G08B 13/19604; G08B 13/19606; G08B 13/19673; G08B 13/19689; G08B 29/185; G08B 21/18
USPC ........................................................ 382/103
See application file for complete search history.

(56) References Cited

U.S. PATENT DOCUMENTS

2010/0080473 A1 *  4/2010  Han .................. H04N 19/625
                                                                   382/250
2012/0027304 A1 *  2/2012  Brown .................. G06V 20/70
                                                                   382/190

(Continued)

*Primary Examiner* — Stephen P Coleman
(74) *Attorney, Agent, or Firm* — Nicholas Stadler (57) ABSTRACT

The present application describes a system and method for extending a range of an image detection and classification system that is associated with various image capture devices. The range of the image detection and classification system is extended using one or more of an optical zoom on an area of interest, a digital zoom on the area of interest and a crop operation on the area of interest.

20 Claims, 10 Drawing Sheets

(51) Int. Cl.

| | |
|---|---|
| *G08B 13/196* | (2006.01) |
| *G08B 29/18* | (2006.01) |
| *H04N 7/18* | (2006.01) |
| *G06T 7/11* | (2017.01) |
| *G06T 7/70* | (2017.01) |
| *H04N 5/232* | (2006.01) |
| *G06K 9/62* | (2022.01) |
| *G06T 3/40* | (2006.01) |
| *G06T 9/00* | (2006.01) |
| *G06V 20/20* | (2022.01) |
| *G06V 20/40* | (2022.01) |
| *G06V 20/52* | (2022.01) |
| *G08B 21/18* | (2006.01) |

(56) References Cited

U.S. PATENT DOCUMENTS

| | | | |
|---|---|---|---|
| 2016/0344928 A1* | 11/2016 | Qu | H04N 5/23218 |
| 2016/0381301 A1* | 12/2016 | Shroff | G06T 11/60 |
| | | | 348/240.3 |
| 2018/0276845 A1* | 9/2018 | Bjorgvinsdottir | G06N 3/084 |
| 2019/0316393 A1* | 10/2019 | Huang | E05F 15/42 |

\* cited by examiner

IMAGE PROCESSING SYSTEM FOR EXTENDING A RANGE FOR IMAGE ANALYTICS

CROSS-REFERENCE TO RELATED APPLICATION

The present application claims the benefit of U.S. Provisional Application No. 62/953,117, titled "System for Scalable Processing of Video Clips" filed on Dec. 23, 2019, the entire disclosure of which is hereby incorporated by reference in its entirety.

BACKGROUND

Security cameras and associated video analytics systems are typically used to detect and identify an object of interest. However, the range at which an object can be detected and subsequently identified is typically limited.

SUMMARY

The present application describes a system and method for identifying and classifying an object of interest in an image analysis system. An image analysis system and its associated image capture devices may detect an object of interest as the object of interest moves within a field of view of the image capture devices. However, it may be difficult to classify the object of interest into a particular category (e.g., human, animal, vehicle, etc.) when the object of interest is far from the image capture device and/or the object of interest takes up a small portion of the field of view of the image capture device.

In order to remedy the above, an effective range of an image processing system may be increased such that the object of interest can be more easily identified and classified. For example, an image capture device may capture a number of images of scene, identify a location of an object of interest, perform a digital and/or optical zoom on the object of interest in order to focus on the object of interest, and subsequently identify/classify the object of interest. In some examples, an artificial intelligence or machine learning classifier is used to classify the object of interest. In other examples, classification may be performed based on user input. In another example, a classification algorithm may learn to classify object based, at least in part, on user input.

Accordingly, the present application describes a method that includes receiving a first series of images of a scene and receiving a second series of images of the scene. The first series of images is analyzed to identify an object of interest. The object of interest is located in an area within the scene. Based on identifying the object of interest, a corresponding area within the second series of images is determined. The corresponding area within the second series of images includes the object of interest. At least a portion of the corresponding area is selected. The selected portion includes the object of interest and has a set of resolution attributes for classifying the object of interest. The object of interest may then be classified.

The present application also describes an image analysis system. The image analysis system includes a processor and a memory. The memory stores computer executable instructions that, when executed by the processor, perform various operations. The operations may include receiving a first image of a scene and receiving a second image of the scene. An object of interest may be detected in the first image of the scene. Based on detecting the object of interest in the first image of the scene, the object of interest in located in the second image. A crop operation is performed around the object of interest in the second image to generate a cropped image. The cropped image may be classified using the cropped image.

The present application also describes a method for classifying a detected object of interest. In an example, this method may include receiving, from a first image capture device, a first series of images of a scene. The first series of images may have a first set of resolution attributes. The method may also include receiving, from the first image capture device, a second series of images of the scene. The second series of images may have a second set of resolution attributes that are higher than the first set of resolution attributes. An object of interest may be detected in the first series of images. The object of interest is then located in the second series of images. An area in the second series of images is selected. The area includes the object of interest and the area is analyzed. When it is determined additional processing is needed to classify the object of interest a third series of images of the area is received from a second image capture device. The third series of images may include an optically zoomed and/or a digitally zoomed view of the area. A crop operation is performed within the zoomed view of the area. The crop operation includes the object of interest. A cropped image is generated based on the crop operation and the object of interest is classified using the cropped image.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations, specific embodiments, or examples. These aspects may be combined, other aspects may be utilized, and structural changes may be made without departing from the present disclosure. Examples may be practiced as methods, systems, or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes an image analysis system that may be used to effectively increase or otherwise extend a range of one or more image capture devices that are associated with the image analysis system. The one or more image capture devices may be used, in conjunction with the image analysis system, to automatically detect and classify objects of interest in a captured scene, image, or series of images. The image analysis system may also issue an alert if the classified object corresponds to one or more flagged classes. A flagged class can be any selected object class, including humans, cars, animals, and so on.

As will be described in detail below, the image analysis system includes, among other systems, a storage system, an object classification system, and an instruction system. The image analysis system evaluates an image or a series of images captured by one or more image capture devices that are associated with the image analysis system in order to detect an object of interest. In some examples, the image analysis system may detect the object of interest based on a motion of the object of interest. The image analysis system may also detect the object of interest by comparing one or more images in the series of images to one or more reference images and identifying changes between the images. In another example, the image analysis system may detect an object of interest by recognizing a shape in the captured image. In an example, the image analysis system selects an area of the captured image that contains the object of interest and only provides the selected area to the object classification system. The object classification system will then classify the detected object of interest. In another example, the object of interest may be classified based on received input. For example, an object of interest may be displayed on a user interface. Once displayed, a user may provide a classification and/or determine whether the object of interest is a potential threat.

In an example, the object classification system compares the classified object of interest to one or more flagged classes. When the object of interest corresponds to a flagged class, the object classification system may cause an alert to be issued. In some examples, the alert is sent to a computing device associated with the image processing system. When the object of interest does not correspond to a flagged class, the object of interest may be ignored.

If the object classification system is unable to classify the object of interest with the image captured by the first image capture device, the first image capture device may autonomously command and/or control a second, moveable image capture device associated with the image analysis system to focus on, zoom-in on or otherwise track movement of the detected object of interest. The image analysis system may autonomously command and/or control the second image capture device. The object classification system may classify the object of interest using one or more images captured by the second image capture device. As used herein, the term "autonomous" means that human support or input is not required for the image capture devices and/or the image processing system (or the various systems of the image processing system) to operate.

In an example, the image processing system may accurately detect and/or classify an object of interest using an image with a lower resolution than is native to the image capture device. For example, some image capture devices may capture images in a particular resolution (e.g., 4k resolution, 8k resolution). However, the image analysis system may be able to detect and classify an object of interest using a subsampled image (e.g., an image that does not utilize the full resolution capabilities of the image capture device). However, even though the object of interest may be detected and classified with a lower resolution image, the higher resolution image may also be available for analysis. Accordingly, when an object of interest is detected in the lower resolution image, the image processing system and/or one or more image capture devices can autonomously crop around and zoom in on the object of interest within the higher resolution image. The higher resolution image includes a sufficient number of pixels to "zoom" in on the object of interest. Using the cropped image, the image analysis system may then be able to classify the object of interest more accurately—even if the object of interest is far away.

In another example, when an object of interest is detected, an image capture device may optically zoom in on the object of interest. In some examples, the image capture device is a pan-tilt-zoom (PTZ) image capture device. The PTZ image capture device will pan, tilt, and/or optically zoom to focus on the object of interest. Once the image capture device pans, tilts, and/or optically zooms in on the object of interest, the crop and zoom process described above may be performed since the image analysis system may use a lower resolution image than is native to the image capture device. Accordingly, using the operations described above, an effective range of one or more image capture devices is increased.

These and other features will be described in more detail with respect to FIG. 1A-FIG. 5.

Figure 1A:
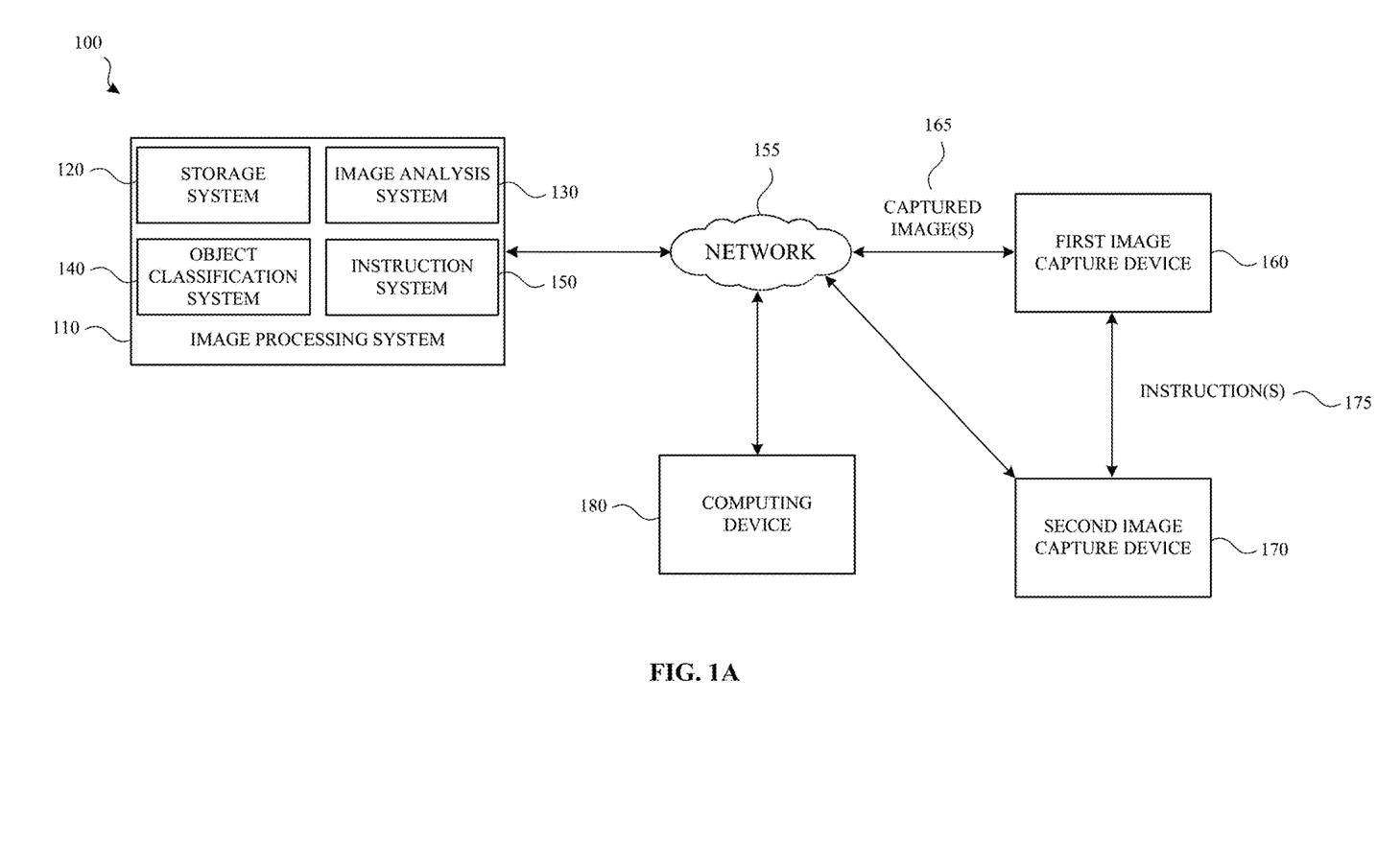
FIG. 1A illustrates an example autonomous image analysis and classification system according to one or more examples.

FIG. 1A illustrates an example autonomous image analysis and classification system 100 according to an example. The autonomous image analysis and classification system 100 may include an image processing system 110. The image processing system 100 analyzes and classifies objects of interest in one or more captured images 165. The captured images 165 may be provided to the image processing system 100 from a first image capture device 160 and/or a second image capture device 170 via a network 155. Although a single image processing system 110 is shown, the autonomous image analysis and classification system 100 may include multiple image processing systems 110.

The image processing system 110 may include a storage system 120, an image analysis system 130, an object classification system 140, and an instruction system 150. Once the captured images 165 are received, the image processing system 100 analyzes and classifies objects of interest in the captured images 165.

The image processing system 110 may, via network 155 (or other communication channel) communicate with, send instructions 175 to and/or receive various captured images 165 from one or more image capture devices such as, for example, the first image capture device 160 and the second image capture device 170. In an example, the first image capture device 160 is communicatively coupled to the second image capture device 170. The first image capture device 160 may be stationary (e.g., fixed) having a fixed field of view. The second image capture device 170 may be moveable such that the second image capture device 170 may be able to view any object or location within the field of view of the first image capture device 160.

In an example, the first image capture device 160 may be partially stationary (e.g., have limited movement) and have a semi-fixed field of view. In another example, the first image capture device 160 may be moveable and/or rotatable about various axes and provide and/or capture images having a variety of different fields of view. The instructions 175 may cause the second image capture device 170 to pan, tilt or zoom on a detected object of interest and/or an area of interest within the field of view of the first image capture device 160. The instructions 175 may also cause the second image capture device 170 to capture various images of the object of interest and/or the area of interest. In some examples, the image processing system 110, via the instruction system 150, may send instructions 175 to the first image capture device 160 and/or the second image capture device 170 via the network 155.

Although FIG. 1A shows two image capture devices, the autonomous image analysis and classification system 100 may include any number of image capture devices and each image capture device may be fixed image capture devices, moveable image capture devices, or a combination of fixed and moveable image capture devices.

As described above, as the first image capture device 160 and/or second image capture device 170 capture various images, the captured images 165 are provided to the image processing system 110 via the network 155. Although a network 155 is specifically mentioned, other communication channels (e.g., Bluetooth, cable connection, infrared) may be used.

The captured images 165 may be stored in the storage system 120 and/or analyzed by the image analysis system 130. In an example, the image analysis system 130 detects an object of interest by comparing the captured images 165 with one or more reference images. Changes between the captured images 165 and the one or more reference images may indicate that an object of interest is present in the field of view of the first image capture device 160 and/or the second image capture device 170.

The image analysis system 130 may also detect an object of interest by identifying differences in the captured images 165. The differences in the captured images 165 may suggest an object of interest is moving through the scene. The image analysis system 130 may also detect an object of interest by recognizing a shape in the captured images 165. For example, the image analysis system 130 may detect a person by recognizing the general shape of a person and/or by recognizing arms, legs, a head, and so on.

The image analysis system 130 may also perform various image processing actions on the captured images 165. The processes may include, but are not limited to, compressing, resampling or otherwise altering the captured images 165 to reduce the number of pixels, improving the sharpness of the captured images 165, smoothing the captured images 165, reducing noise, and other types of digital image processing techniques. The storage system 120 may store the processed images so the various systems of the image processing system 110 may subsequently access the processed images.

The first image capture device 160 and/or the second image capture device 170 may support multiple streams of images. Each stream may have a different resolution, a different frame rate, and/or a different field of view. For example, the first image capture device 160 may generate or otherwise be associated with a first stream of images. The first stream of images may have a first resolution. The first resolution may be a resolution that is suitable for detecting objects of interest. For example, the image analysis system 130 may prefer a lower resolution image to a higher resolution image in order to more quickly identify an object of interest. This may be possible because the image analysis system 130 need not process as many pixels in the lower resolution image but still may be able to detect the object of interest. In an example, the first stream of images may include a field of view that is equivalent or substantially equivalent to the field of view of the first image capture device 160.

A second stream of images may also be generated by the first image capture device 160 (or generated from the captured images 165) and may include images with a higher resolution when compared with the resolution of the first stream of images. The second stream of images may be subjected to one or more crop and zoom processes such as described below in order to more accurately identify an object of interest and/or to increase the range of the first image capture device 160 and/or the second image capture device 170.

For example, when the image analysis system 130 detects an object of interest in the first stream associated with the captured images 165, an area of interest associated with the object of interest is identified. A corresponding area of interest in the second stream of images may also be identified. The image analysis system 130 may then perform a crop and digital zoom around the area of interest/object of interest so the object of interest may be more easily identified. The storage system 120 may store the cropped images.

Figure 3A:
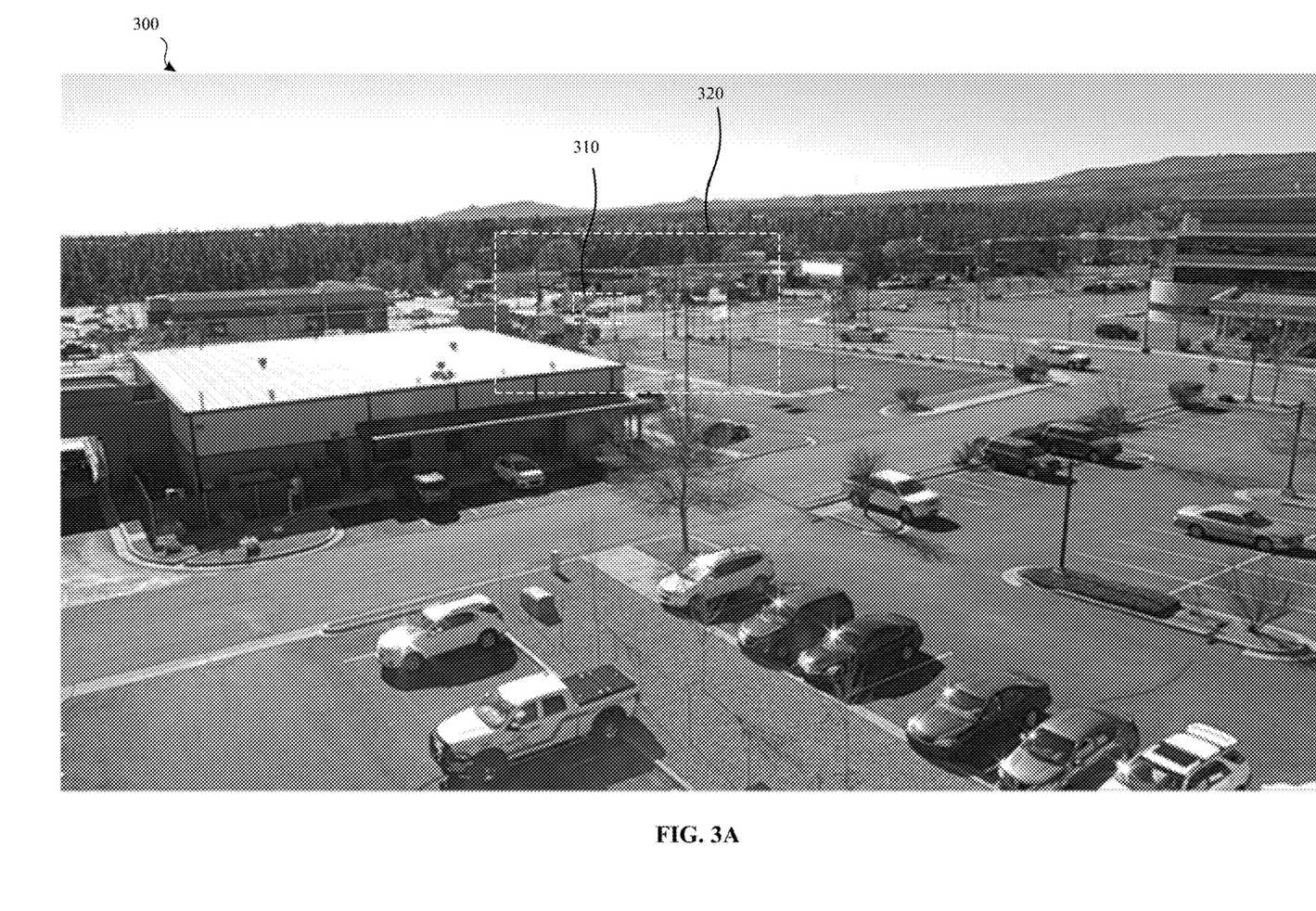
FIG. 3A illustrates an image with an area that includes an object of interest according to one or more examples.
Figure 3B:
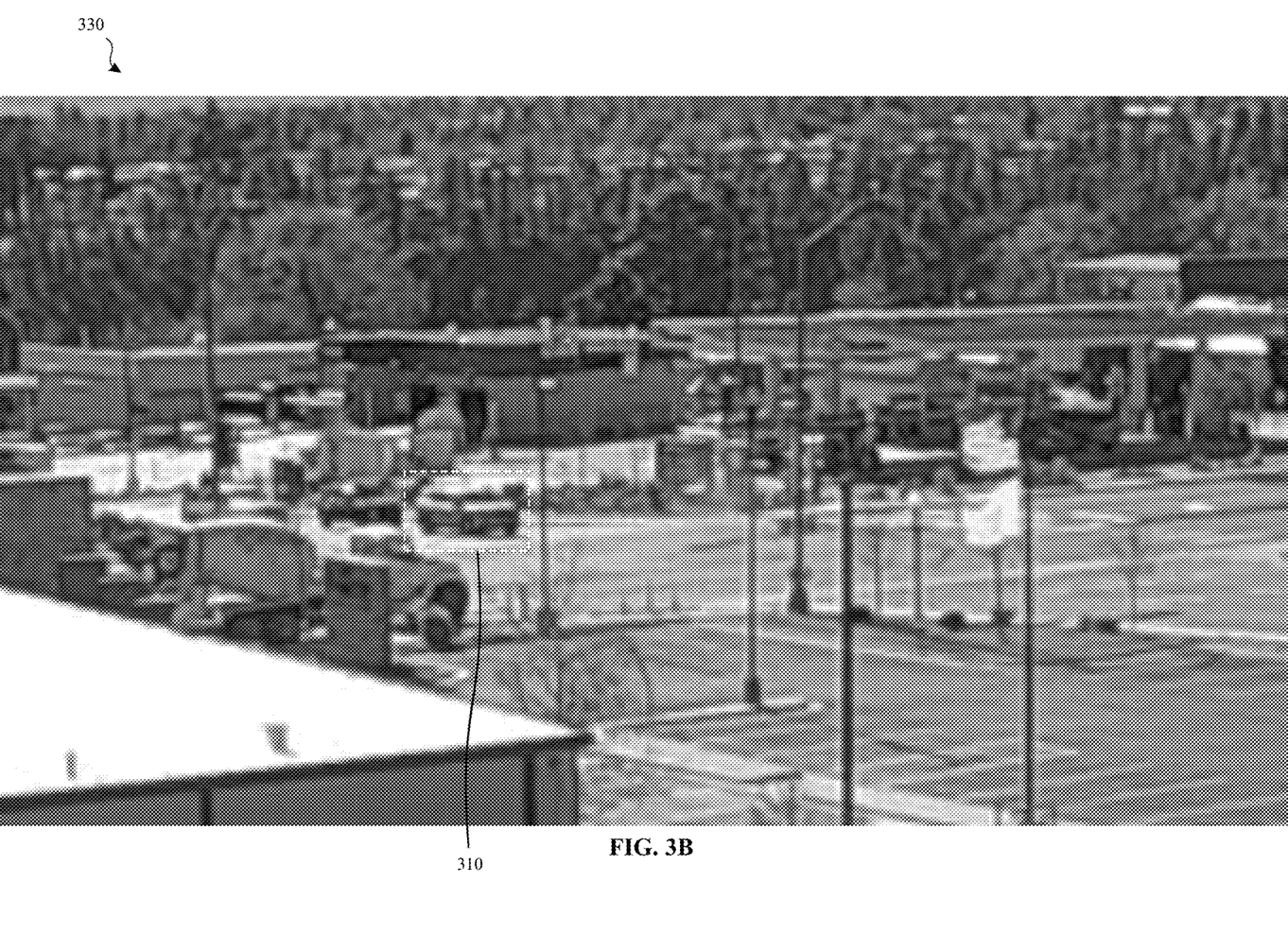
FIG. 3B illustrates a cropped image that includes an object of interest according to one or more examples.
Figure 4A:
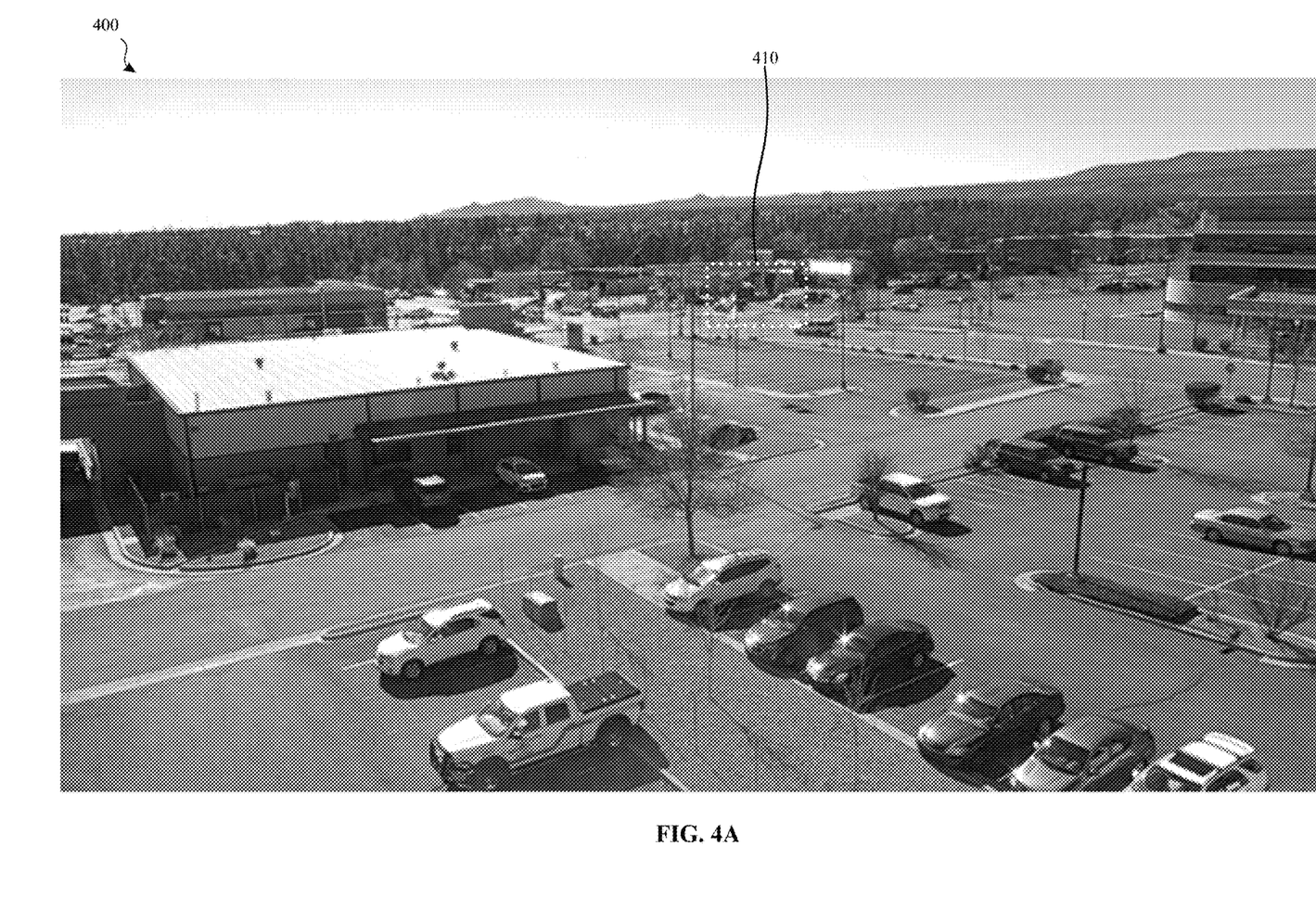
FIG. 4A illustrates an image with an area that includes an object of interest according to one or more examples.
Figure 4B:
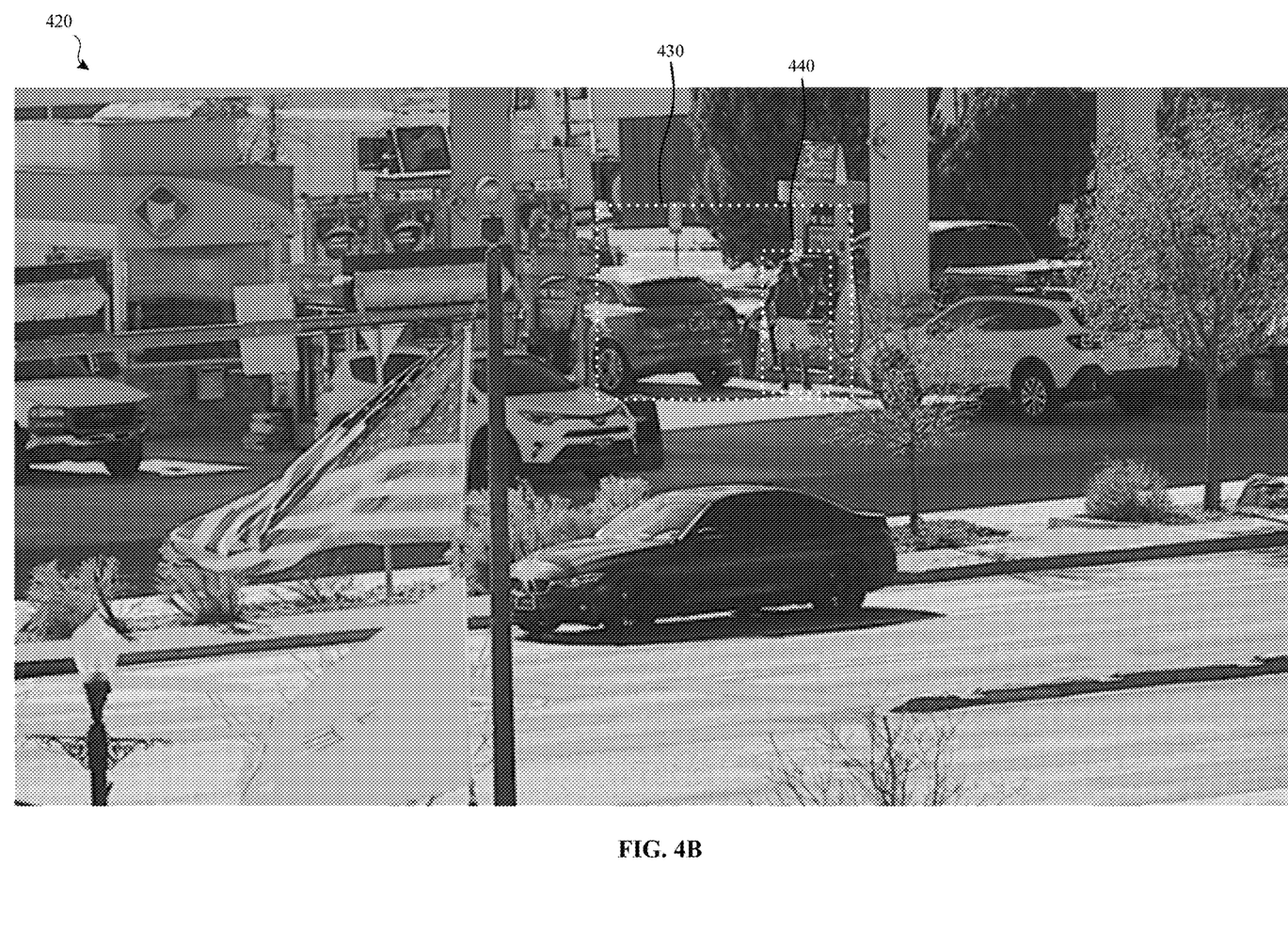
FIG. 4B illustrates an image of an area that includes an object of interest according to one or more examples.
Figure 4C:
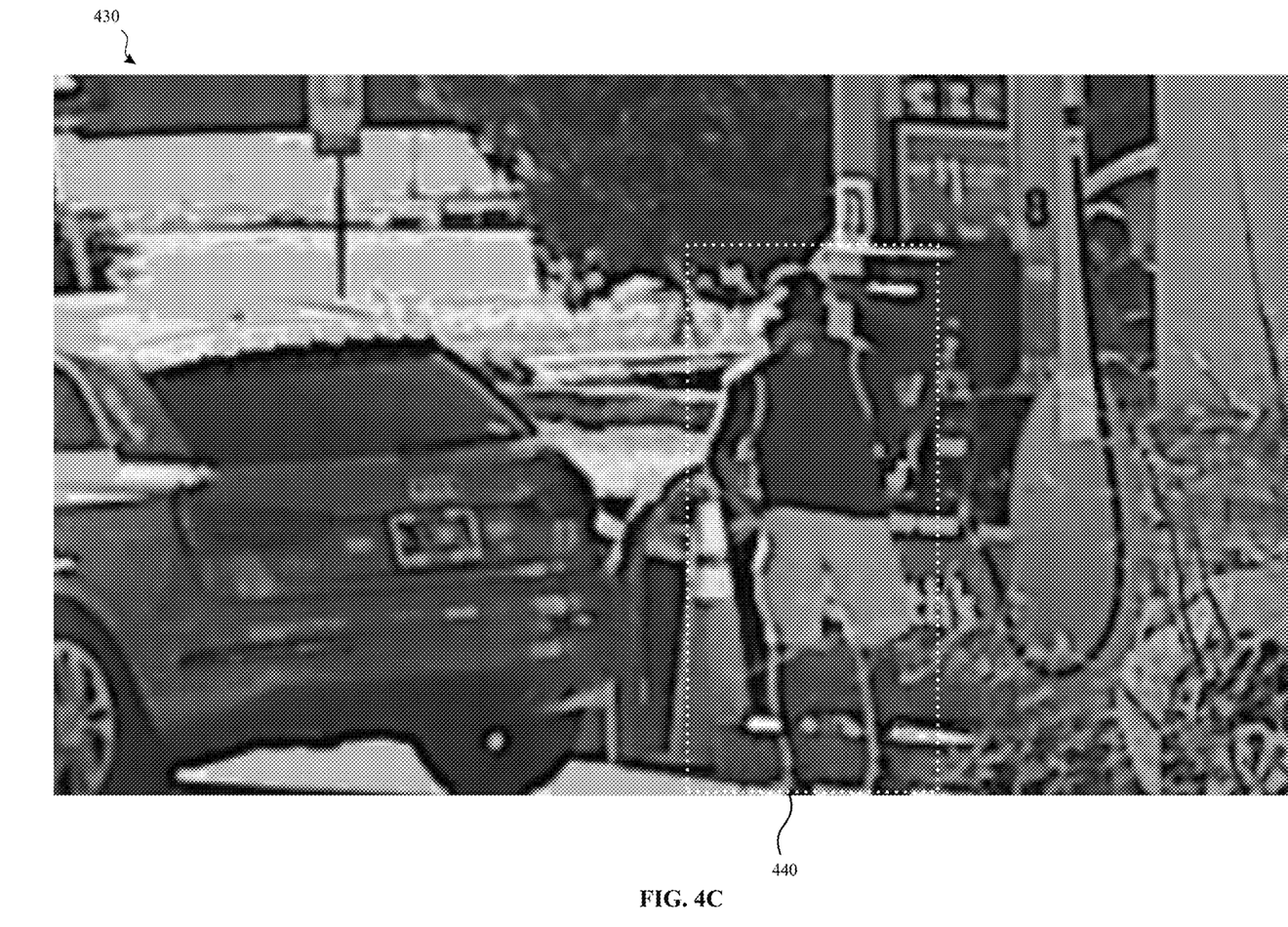
FIG. 4C illustrates a cropped image of an area that includes an object of interest according to one or more examples.

The digital crop and zoom process may cause one or more pixels in the area of interest to be "fuzzy" or "blurry" (See for example, FIG. 3B compared to FIG. 3A and FIG. 4B and FIG. 4C compared to FIG. 4A). However, the cropped images may still contain a sufficient level of detail to enable the image analysis system and/or the object classification system 140 to detect and/or classify the object of interest due, in part, to the higher resolution of the second stream of images.

For example and referring to FIG. 3A and FIG. 3B, an example image 300 captured by an image capture device (e.g., the first image capture device 160 (FIG. 1A)) is shown. In this example, the captured image is a high-resolution image. When the image 300 is analyzed by an image analysis system (e.g., image analysis system 130 (FIG. 1A)), the image analysis system may detect an object of interest (indicated by box 310). Although the object of interest is detected, the object of interest may be too far away for an object classification system (e.g., object classification system 140 (FIG. 1A)) to classify the object of interest with a high degree of confidence. Accordingly, the image analysis system may identify an area of interest (represented by box 320) associated with the object of interest. Once the area of interest is identified, the image analysis system may perform a crop operation and/or a zoom operation on the area of interest.

FIG. 3B is an example of a cropped image 330 that is equivalent or substantially equivalent to the area of interest 320. As shown in FIG. 3B, the object of interest (represented by box 310) has been digitally zoomed in on to enable the object classification system 140 to classify the object of interest.

As shown in FIG. 3B, the cropped image 330 may not be as crisp/sharp as the original image 300 due to the digital crop and zoom process. However, since the image classification system may only require a fraction of the total pixels of the original image 300 to accurately identify and/or classify the object of interest, the number of pixels contained in the cropped image 330 is sufficient to enable the object classification system to accurately classify the object of interest as a car.

Referring back to FIG. 1A, the second stream of images may enable the object classification system 140 to accurately detect and identify the object of interest at greater distances when compared with current solutions. For example, if the second stream of images has an 8K resolution, the images may be about 8,000 horizontal pixels by 4,000 vertical pixels for a total of 32 million pixels. In an example, the object classification system 140 of the present disclosure may only need an area of 50 horizontal pixels by 50 vertical pixels, for a total of 2,500 pixels, to accurately classify the object of interest. Thus, the object classification system 140 could accurately classify the object of interest even if the object of interest comprises less than 0.01% of the images. The object of interest may be located far from the image capture device because the object of interest only needs to make up about 0.01% of the image in this example.

In another example, given a second stream of images with a resolution of 240p, or a resolution of 320 pixels by 240 pixels for a total of 76,800 pixels, the object classification system 140 would require the object of interest to make up over 3.25% of the images to accurately classify the object of interest. In this example, the resolution limits the range at which the object classification system 140 can accurately classify objects. An object of interest that is 3.25% of the image is closer to the image capture device than an object of interest that makes up less than 0.01% of the image. Therefore, the range of the object classification system 140 is effectively extended, because a higher resolution stream allows the image analysis system 130 to select and crop an area of interest around the object of interest that is a smaller portion of the entire image.

By using multiple streams, one stream may not need to be cropped and the image analysis system 130 can continue to use the stream to detect objects of interest in the entire field of view. The image analysis system 130 may use a second stream to crop and zoom in on a detected object of interest. As described above, the second stream may have the maximum resolution the image capture device can output which may enable multiple crop and zoom processes to be performed on multiple areas of interest or in a single area of interest.

In some examples, there may be additional streams. For example, the image capture device may identify two objects of interest in the first stream. The second stream can focus on one object of interest and a third stream can focus on a second object of interest so the object classification system 140 may classify both objects of interest simultaneously or substantially simultaneously.

In an example, the first image capture device 160 and/or the second image capture device 170 may support multiple streams. Each stream may be used to set the captured images 165 to a desired resolution, frame rate, and field of view. For example, one stream may be set to a resolution appropriate for the image analysis system 130 to detect objects of interest. Another stream may be set to the highest resolution available for the object classification system 140 to classify objects of interest with the maximum range possible as described above.

When all the image capture devices support multiple streams, multiple objects of interests in each field of view of the image capture devices can be detected and classified simultaneously or substantially simultaneously. For example, the image analysis system 130 may analyze different streams, each having overlapping and/or different fields of view. The image analysis system 130 may detect one or more objects of interest in each stream. The image analysis system 130 can process the images and select and crop to an area containing each object of interest. The image analysis system 130 may use one stream for each detected object of interest so an area may be selected and cropped for each object of interest concurrently.

For example, a second stream of one field of view may be cropped to focus on a first object of interest in the field of view, a third stream of the field of view may be cropped to focus on a second object of interest in the field of view, and so on. There may be multiple streams for each field of view. The object classification system 140 may then classify each detected object of interest. In an example, the streams can be used in order of priority to classify objects of interest having higher priority first if there are not enough image capture devices and associated streams for the object classification system 140 to classify all detected objects of interest at the same time.

In examples, the image analysis system 130 may analyze a first stream or series of captured images 165 the image processing system 110 receives to detect an object of interest in a particular area such as described above. The image analysis system 130 may then locate a corresponding area and/or the detected object of interest in the second stream or series of images by using techniques described above.

The second stream or series of images may be equivalent to and/or generated from the first stream or series of images. In another example, the image capture device may generate multiple streams of images. However, the second stream of images may have a different, higher, resolution such as previously described. The image analysis system 130 may crop the images to provide images that contain only the area in which the object of interest is located. These cropped images may then be provided to the object classification system 140.

The cropped images may be used by the object classification system 140 to ignore irrelevant details (e.g., details that do not assist the image analysis system 130 and/or the object classification system 140 to detect and/or classify the object of interest) of the image outside of the area of interest. In some examples, the object classification system 140 may classify the object of interest more accurately (e.g., with a higher confidence level) when the area of interest only includes the object of interest compared to when the area includes the object of interest and additional objects (e.g., rocks, trees).

Additionally, the area of interest may have a resolution to allow the object classification system 140 to classify the object of interest. For example, the object classification system 140 may require an image that is fifty pixels by fifty pixels. The image analysis system 130 may select an area having resolution attributes of the predetermined amount of horizontal pixels and predetermined amount of vertical pixels. In additional examples, the image analysis system 130 may process the selected area of interest, such as compressing, resampling or otherwise altering the image, so the area of interest has the desired resolution attributes and includes the object of interest.

The object classification system 140 may select the area of interest containing the object of interest and process the area of interest as needed. In an additional example, the object classification system 140 may crop or process the area of interest before the object of interest is classified and/or in response to the object classification system failing to accurately classify the object of interest. For example, the object classification system 140 may further crop the images to remove unwanted parts of the image and/or process the image using techniques described above to accurately classify the object of interest.

In some examples, the image analysis system 130 will send the analyzed and processed images and areas of the images to the storage system 120. This may allow the object classification system 140 to access the analyzed and processed images.

Once the image analysis system 130 detects one or more objects of interest in the captured images 165, processes the images, and selects areas containing the one or more objects of interest, the object classification system 140 may classify the one or more objects of interest. In some examples, the object classification system 140 is an artificial intelligence or machine learning classifier. The object classification system 140 may use any classification technique including pixel-based classification and object-based classification. The object classification system 140 may use various pixel-based classification techniques and/or object-based classification techniques.

In some examples, as the images are being captured by the image capture devices, the captured images 165 may be sent to the computing device 180. The computing device 180 may be remote with respect to the various image capture devices of the autonomous image analysis and classification system 100. As such, the computing device 180 may receive the captured images 165 over the network 155. Alternatively, the computing device 180 may be communicatively coupled to each image capture device in the autonomous image analysis and classification system 100 to individual image capture devices of the system using various communication protocols such as those described above. In addition, although a single computing device 180 is shown, the autonomous image analysis and classification system 100 may include multiple computing devices 180. In one example, the computing device 180 may be used to enable an authorized operator or user to view, access and/or control the various image capture devices and/or images in the autonomous image analysis and classification system 100.

The computing device 180 may also communicate with and/or control the image processing system 110. Additionally, the computing device 180 may receive processed, digitally zoomed, and/or optically zoomed images from the image processing system 110. In an example, the computing device 180 may send instructions 175 to the image processing system 110 causing the image processing system 110 to analyze specific images and classify specific detected object of interest. The object classification system 140 may send an alert to be displayed on the computing device 180 when a classified object corresponds to a flagged class. Also, when the image processing system 110 sends an alert to the computing device 180, the image processing system 110 may send instructions 175 causing the image capture device to send a live series of images containing the object of interest to the computing device 180. This may allow an operator of the computing device 180 to be aware of the object of interest and be aware of the location of the object of interest.

In another example, each image capture device in the autonomous image analysis and classification system 100 may be identified on the network using, for example, a name, IP address or other such identifier. Using the identifier, each fixed camera may be associated with one or more PTZ cameras and vice versa.

In some examples, the digital crop and zoom process described above may also be performed with an optical zoom process to further increase the effective range of the image processing system 110. For example and referring to FIG. 1B, once the captured images are received, the image processing system 100, via the instructions system 150, may provide an image request 185 to the first image capture device 160 and/or the second image capture device 170. The image request 185 may include instructions 175 that cause the second image capture device 170 to optically zoom in on an object of interest. In an example, the image request 185 may be provided to the first image capture device 160 and the first image capture device 160 may send pan, tilt and/or zoom instructions (shown as instructions 175) to the second image capture device 170.

Figure 1B:
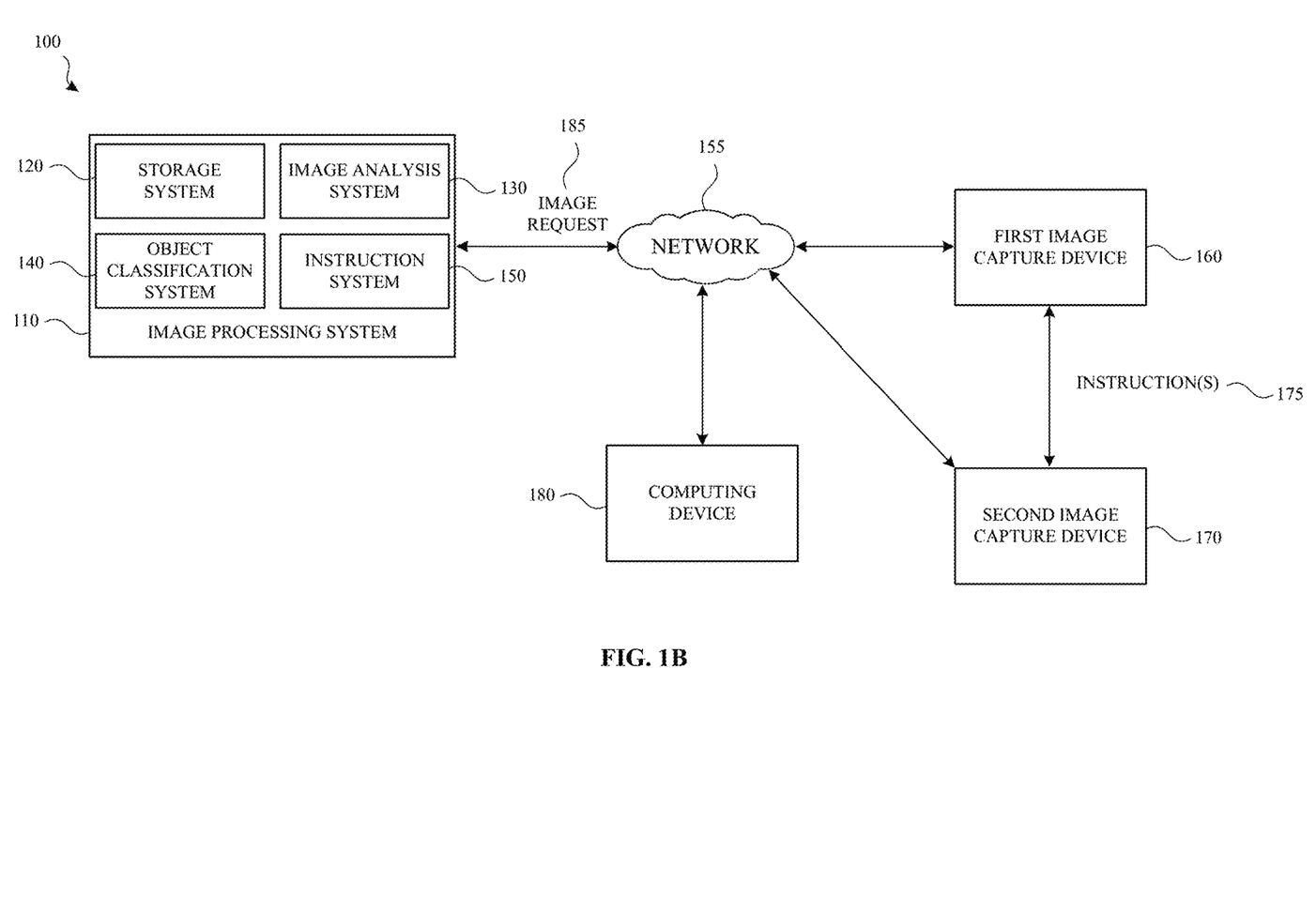
FIG. 1B illustrates an example autonomous image analysis and classification system according to one or more examples.
Figure 1C:
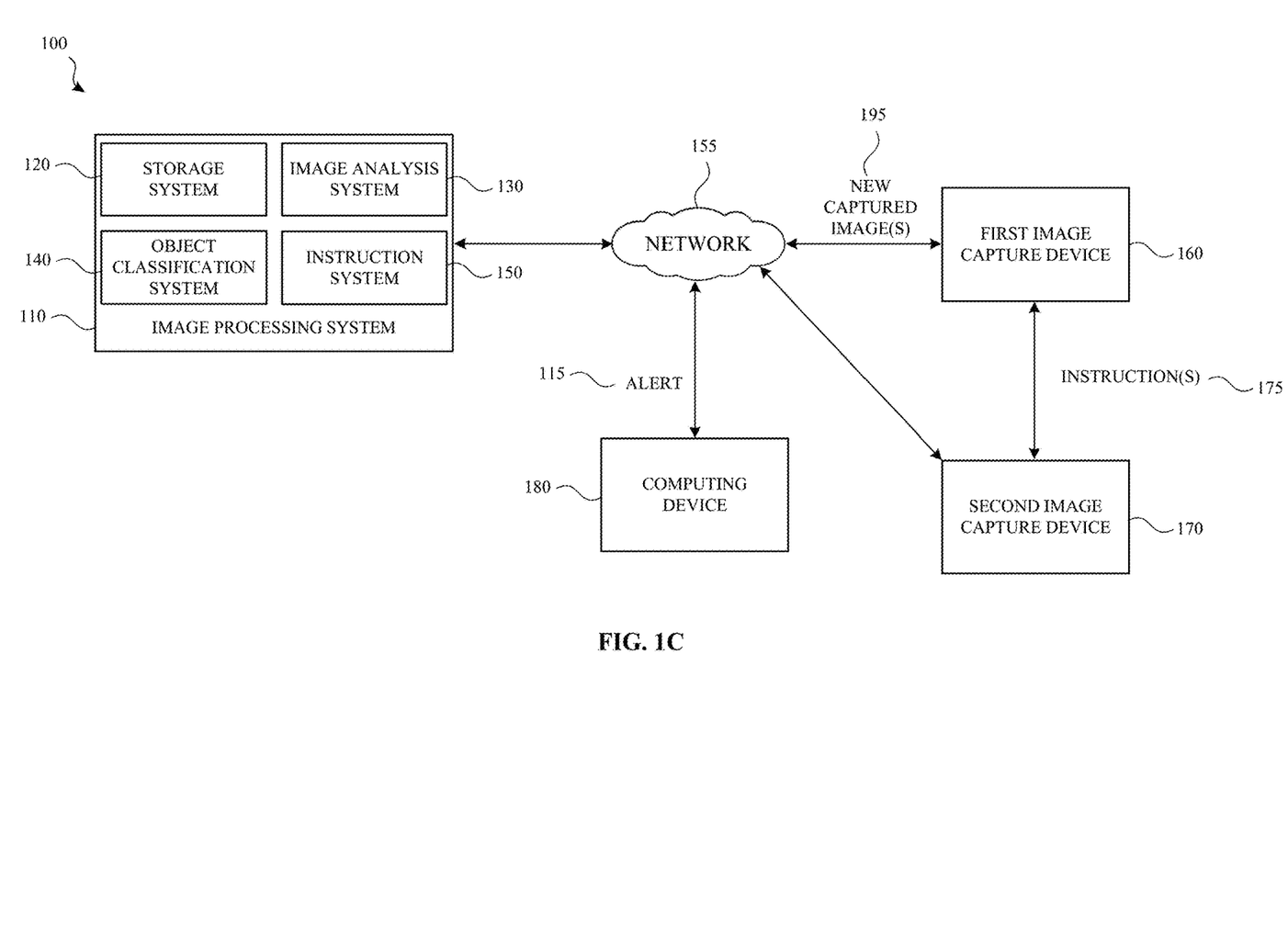
FIG. 1C illustrates an example autonomous image analysis and classification system according to one or more examples.

In other examples, the digital crop and zoom process described above may also be performed with a second image capture device to further increase the effective range of the image processing system 110. The second image capture device 170 may be a high-resolution image capture device configured to optically and/or digitally zoom in on an object of interest. In an example, the second image capture device 170 may have a higher resolution than the first image capture device 160. In an example, the image request 185 may include instructions 175 that cause the second image capture device 170 to capture new captured images 195 (FIG. 1C).

In an example, the image request 185 may be generated and communicated to the first image capture device 160 and/or the second image capture device 170 based on a determination that the captured images 165 are insufficient for the object classification system 140 to classify the one or more objects of interest. For example, the first image capture device 160 may provide the highest resolution possible of the captured images 165 but the object of interest may be so far from first image capture device 160 that the captured images 165 do not have enough detail for the object classification system 140 to accurately (e.g., have a confidence level above a confidence threshold that the object of interest was classified correctly) classify the object of interest.

In some examples, the instruction system 150 may send the image request 185 even though the object classification system 140 is able to classify the object of interest. For example, the instruction system 150 may send the image request 185 if the object classification system 140 classified the object of interest but has a degree of certainty of the accuracy of the classification below a threshold amount. For example, the object classification system 140 may be 55% certain that the classification of the object of interest is accurate. However, there may be a predetermined threshold to send an image request 185 if the object classification system 140 is not at least 65% certain the classification is accurate. Although specific thresholds are mentioned, other thresholds may be used. In some examples, the thresholds may be based on past accuracy of the analysis/classification of objects of interest at a particular distance or range of distances. In another example, the thresholds may be based on time of day, user input and the like.

In response to the image request 185 and/or the instructions 175, the second image capture device 170 may capture new captured images 195 (FIG. 1C) and provide the new captured images 195 to the image processing system 110. In an example, the new captured images 195 may be a series of images in which an optical zoom has not been performed. For example, the new captured images 195 may be higher resolution when compared to the captured images 165 (FIG. 1A). For example, if the second image capture device 170 is an 8K resolution image capture device, the second image capture device 170 can capture the entire scene in 8K resolution without optically zooming in. In another example, the second image capture device 170 may optically zoom in on the object of interest and then a digital crop and zoom process may be performed such as described above.

For example and referring to FIG. 4A-FIG. 4C, FIG. 4A illustrates a captured image 400 with an identified area of interest 410 containing an object of interest. In order to more accurately identify and/or classify the object of interest, the instruction system 150 and/or the first image capture device 160 may cause the second image capture device 170 to optically zoom in on the area of interest 410. The resulting image 420 is shown in FIG. 4B.

As shown in FIG. 4B, the object of interest is identified (represented by box 440). The object of interest may be associated with an area of interest 430. The image analysis system 130 may crop and/or digitally zoom in on the image 420. Although not required, the digital crop and zoom may provide a larger view of the object of interest (represented by box 440) such as shown in FIG. 4C. The image 420 shown in FIG. 4C may be provided to the image classification system such as previously described. Once the image is classified, an instruction system 150 may trigger an alert 115. The alert 115 may be provided to the computing device 180.

Figure 2:
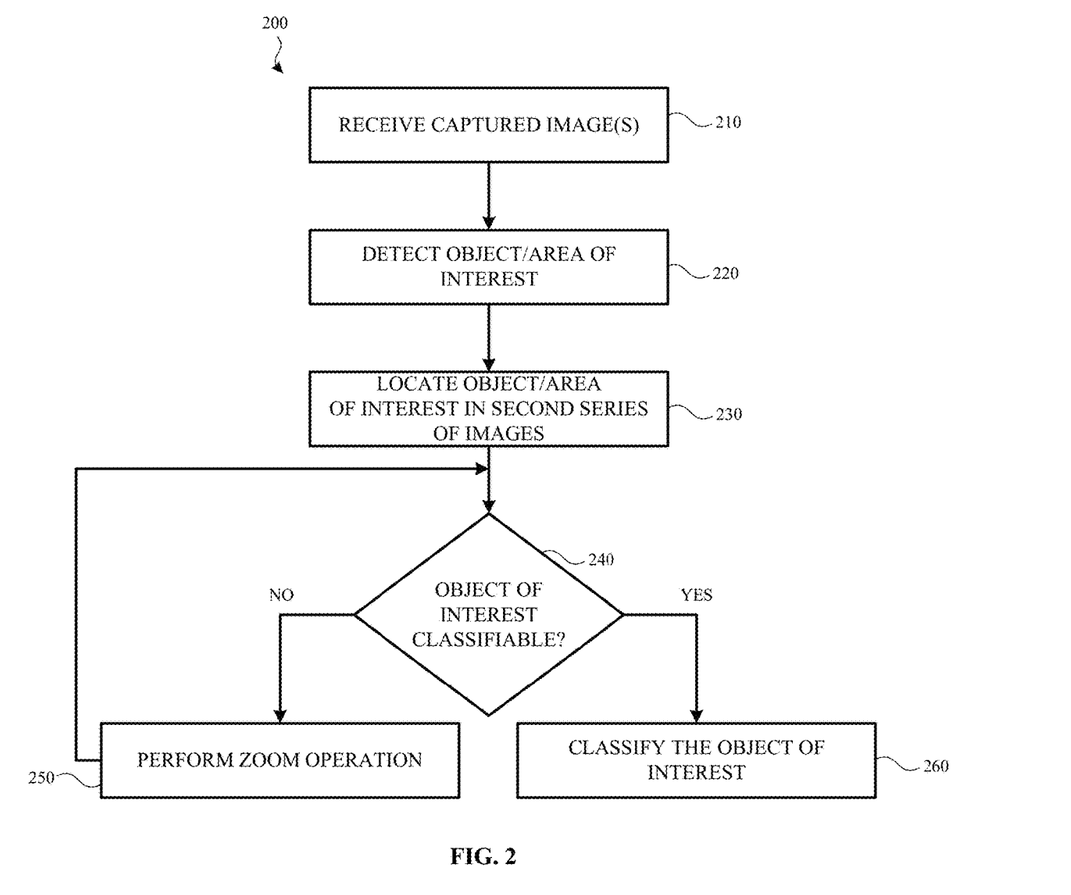
FIG. 2 illustrates a method for receiving and analyzing images to classify an object of interest according to one or more examples.

FIG. 2 illustrates a method 200 for receiving and analyzing images to classify an object of interest according to one or more examples. The method 200 may be performed by one or more systems of the autonomous image analysis and classification system 100 and/or one or more image capture devices of the autonomous image analysis and classification system 100 shown and described above with respect to FIG. 1.

Method 200 begins when the image processing system receives (210) captured images from one or more image capture devices. For example, the image processing system may receive captured images from a first image capture device and/or a second image capture device over a communication channel such as, for example a network. In an example, the captured images may include a first stream of images and a second stream of images. The first stream of images may have a first resolution and the second stream of images may have a second, higher resolution. In another example, each stream of images may have the same resolution but one stream of images (e.g., the first stream of images) may be processed (e.g., downsampled) such that the first stream of images has a lower resolution. In an example, the lower resolution may be a resolution requested by an image analysis system and/or an object classification system to enable the image analysis system to detect an object of interest in the stream of images and/or enable the object classification system to classify the object in the stream of images.

Once the stream of images is received, the image analysis system may detect (220) an object of interest. The object of interest may be detected in the first stream of images. An area of interest associated with the object of interest may also be identified.

A corresponding object of interest and/or area of interest may then be identified (230) in the second series of images. Once the object of interest and/or the area of interest has been identified, a determination (240) is made as to whether the object of interest is able to be classified. In an example, the determination is based on a confidence level associated with the classification of the object of interest. For example, if the confidence level of the classification is above a confidence level threshold (e.g., the object classification system determines its confidence level is 70% based on, for example, previously classified images or other training information) object of interest may be classified (260).

However, if it is determined that the object of interest is not classifiable and/or the confidence level of the classification is below a confidence level threshold, a zoom instruction may be used to either optically and/or digitally zoom (250) in on the object of interest. In one example, the image analysis system may perform a digital zoom on a captured image such as described above. In another example, the first image device may perform the digital zoom and provide the resulting image to the image processing system.

In another example, the zoom operation may be an optical zoom. The optical zoom may be performed by the second image capture device. The optical zoom may be followed by a digital zoom such as described above. Multiple zoom and/or crop and zoom actions may be performed until it is determined (240) the object of interest is classifiable or until a determination is made (e.g., by the object analysis system) that additional crop and/or zoom processes will not further improve the confidence level of the object classification. The object of interest may then be classified (260).

Figure 5:
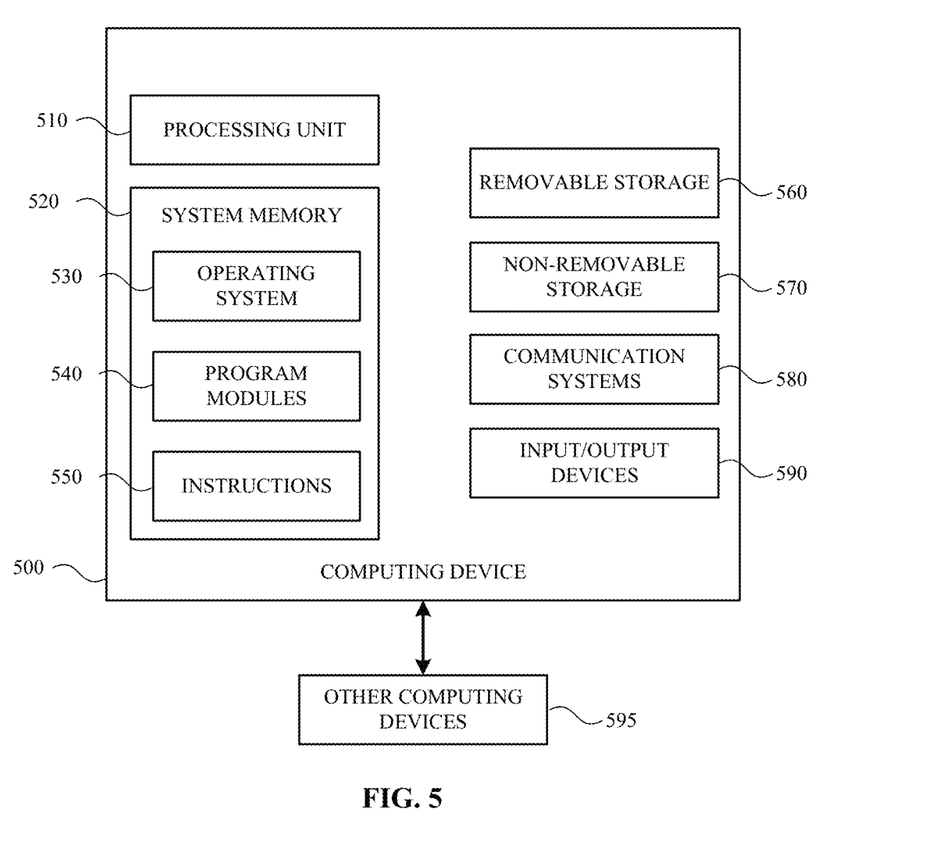
FIG. 5 illustrates an example computing device that may be used or otherwise incorporated with the various systems described herein.

FIG. 5 is a system diagram of a computing device 500 according to an example. The computing device 500, or various components and systems of the computing device 500, may be integrated or associated with an image capture device, an intrusion detection system, and/or an image processing system. As shown in FIG. 5, the physical components (e.g., hardware) of the computing device are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. The program modules 540 may be responsible for gathering images, analyzing images, and providing various instructions 550. A number of different program modules and data files may be stored in the system memory 520. While executing on the processing unit 510, the program modules 540 may perform the various processes described above.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 500 may include one or more communication systems 580 that enable the computing device 500 to communicate with other computing devices 595 such as, for example, routing engines, gateways, signings systems and the like. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel ports, serial ports, etc.

The computing device 500 may also have one or more input devices and/or one or more output devices shown as input/output devices 590. These input/output devices 590 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
    receiving, from a first image capture device, a first series of images of a scene, the first series of images having a first set of resolution attributes;
    receiving, from the first image capture device, a second series of images of the scene, the second series of images having a second set of resolution attributes that are higher than the first set of resolution attributes;
detecting an object of interest in the first series of images;
locating the object of interest in the second series of images;
selecting an area of the second series of images, the area including the object of interest;
    analyzing the area; and
    when it is determined additional processing is needed to classify the object of interest:
receiving, from a second image capture device, a third series of images of the area, the third series of images comprising an optically zoomed view of the area;
performing a crop operation within the zoomed view of the area, the crop operation including the object of interest;
generating a cropped image based on performing the crop operation; and
classifying the object of interest using the cropped image.

2. The method of claim 1, comprising:
    determining whether the object of interest is associated with a flagged class; and
    based on determining the object of interest is associated with the flagged class, issuing an alert.

3. The method of claim 1, further comprising altering a resolution of the first series of images.

4. The method of claim 1, further comprising performing a crop operation around the object of interest in the second series of images.

5. A method, comprising: receiving a live-stream of a scene, the live-stream containing a set of two or more images; analyzing a subset of the two images selected from the live-stream, the subset having a lower resolution attribute, to identify a change defining an object of interest located in an area within the scene; and based on identifying the object of interest: determining a corresponding area within a new image of the scene, the new image having a higher resolution attribute, said corresponding area including the object of interest; selecting at least a portion of the corresponding area, the selected portion including the object of interest; classifying the object of interest using the selected portion; and, based on the classification of the object of interest, sending an alert.

6. The method of claim 5, in which the live-stream and the new image of the scene are both captured by a single image capture device.

7. The method of claim 6 wherein the step of 'sending an alert' is based on the classification of a flagged class.

8. The method of claim 6, further comprising:
    altering a resolution attribute of the subset selected from the live-stream prior to the analyzing the subset to identify the object of interest.

9. The method of claim 6, further comprising:
    altering a resolution attribute of the new image prior to the analyzing the subset to identify the object of interest.

10. The method of claim 6, wherein the image capture device is a PTZ camera, further comprising:

Automatously capturing the new image with the PTZ camera zooming in on the object of interest.

11. The method of claim 6, further comprising:
selecting the new image from the live-stream to identify the object of interest.

12. The method of claim 6, in which the alert includes alerting an operator to the object of interest in the live-stream.

13. An image processing system, comprising:
a processor;
an image analysis system,
an image classification system, and
a memory storage system storing computer executable instructions that, when executed by the processor, perform operations, comprising:
  receiving a live-stream of a scene, the live-stream containing a set of two or more images;
  analyzing, with the image analysis system, a sub-set of two images selected from the live-stream, the subset having a lower resolution, to identify a change defining an object of interest located in an area within the scene; and
  based on identifying the object of interest:
    determining a corresponding area within a new image of the scene, the new image having a higher resolution, said corresponding area including the object of interest;
    cropping at least a portion of the corresponding area, the selected portion including the object of interest for classifying the object of interest;
    classifying the object of interest with the Image classification system using the selected portion;
    and, based on the classification of the object of interest, sending an alert.

14. The image processing system of claim 13, further comprising a single image capture device, wherein the live-stream and the new image are both captured by the single image capture device.

15. The image processing system of claim 14, wherein the step of 'sending an alert' is based on the classification of a flagged class.

16. The image processing system of claim 14, wherein the memory storage system storing computer executable instructions that, when executed by the processor, perform operations, which further comprises:
  altering a resolution attribute of the subset selected from the live-stream prior to the analyzing the subset to identify the object of interest.

17. The image processing system of claim 14, wherein the memory storage system storing computer executable instructions that, when executed by the processor, perform operations, which further comprises:
  altering a resolution attribute of the new image prior to the analyzing the subset to identify the object of interest.

18. The image processing system of claim 14, wherein the single image capture device is a PTZ camera, and wherein the memory storage system storing computer executable instructions that, when executed by the processor, perform operations, which further comprises:
  Automatously capturing the new image with the PTZ camera zooming in on the object of interest.

19. The image processing system of claim 14, wherein the memory storage system storing computer executable instructions that, when executed by the processor, perform operations, which further comprises:
  selecting the new image from the live-stream to identify the object of interest.

20. The image processing system of claim 14, in which the alert includes alerting an operator to the object of interest in the live-stream.

* * * * *